United States Patent [19]
Adedeji et al.

[11] Patent Number: 6,096,821
[45] Date of Patent: Aug. 1, 2000

[54] POLYPHENYLENE ETHER RESIN CONCENTRATES

[75] Inventors: Adeyinka Adedeji, Albany; Robert Hossan, Delmar; William E. Pecak, Cohoes; Sai-Pei Ting, Slingerlands, all of N.Y.

[73] Assignee: General Electric Company, Pittsfield, Mass.

[21] Appl. No.: 09/285,419

[22] Filed: Apr. 2, 1999

[51] Int. Cl.⁷ ...................................................... C08L 71/10
[52] U.S. Cl. ........................... 524/508; 524/504; 524/540; 525/68; 525/198; 525/241; 525/391; 525/392
[58] Field of Search .............................. 525/68, 241, 198, 525/391, 392; 524/504, 508, 540

[56] References Cited

U.S. PATENT DOCUMENTS

| | | |
|---|---|---|
| 3,169,925 | 2/1965 | Mahoney . |
| 3,360,591 | 12/1967 | Giammaria et al. . |
| 3,388,435 | 6/1968 | Cizek . |
| 3,883,613 | 5/1975 | Cooper . |
| 4,097,550 | 6/1978 | Haaf et al. . |
| 4,101,503 | 7/1978 | Cooper et al. . |
| 4,101,504 | 7/1978 | Cooper et al. . |
| 4,101,505 | 7/1978 | Cooper et al. . |
| 4,113,800 | 9/1978 | Lee, Jr. . |
| 4,128,602 | 12/1978 | Katchman et al. . |
| 4,139,574 | 2/1979 | Cooper et al. . |
| 4,154,712 | 5/1979 | Lee, Jr. . |
| 4,191,685 | 3/1980 | Haaf et al. . |
| 4,212,832 | 7/1980 | Mitschke et al. . |
| 4,246,169 | 1/1981 | Norris et al. . |
| 4,463,130 | 7/1984 | Serini et al. . |
| 4,520,152 | 5/1985 | Axelrod . |
| 4,692,488 | 9/1987 | Kress et al. . |
| 4,740,554 | 4/1988 | Kress et al. . |
| 4,766,165 | 8/1988 | Kress et al. . |
| 4,837,276 | 6/1989 | Fuhr et al. . |
| 4,879,330 | 11/1989 | De Munck et al. . |
| 4,927,870 | 5/1990 | Ogoe et al. . |
| 5,061,745 | 10/1991 | Wittmann et al. . |
| 5,071,894 | 12/1991 | Weil et al. . |
| 5,084,496 | 1/1992 | Ishida et al. . |
| 5,278,212 | 1/1994 | Ishihara et al. . |
| 5,294,654 | 3/1994 | Hellstern-Burnell et al. . |

FOREIGN PATENT DOCUMENTS

| | | |
|---|---|---|
| 0 491 986 A1 | of 1992 | European Pat. Off. . |
| 0 491 986 A1 | 1/1992 | European Pat. Off. . |
| 0 528 113 A1 | 2/1993 | European Pat. Off. . |
| 0 528 113A1 | 2/1993 | European Pat. Off. . |
| 59-24736 | of 1984 | Japan . |
| 59-45351 | of 1984 | Japan . |
| 63-5161 | of 1988 | Japan . |
| 2-187456 | of 1990 | Japan . |
| 4-279660 | of 1992 | Japan . |

OTHER PUBLICATIONS

Japanese Patent Abstract 59202240 A, dated Nov. 16, 1984, by Inventor: T. Yoshinori et al.

Japanese Patent Abstract 02187456 A, dated Jul. 23, 1990, by Inventor: M. Masataka et al.

Japanese Patent Abstract 04279660 A, dated Oct. 15, 1992, by Inventor: H. Mitsuhiro.

*Primary Examiner*—Mark L. Warzel

[57] ABSTRACT

The invention relates to a process for the manufacture of a thermoplastic composition comprising a polyphenylene ether resin and optionally, a styrenic resin wherein the processes comprises a polyphenylene ether resin in a particulate form having less than about 5% by weight, preferably less than about 2% by weight, more preferably less than about 1% by weight, and most preferably essentially no particles less than about 75 microns in size. The particulate form allows for ease of handling of polyphenylene ether resin with a substantially reduced risk of dust ignition while obtaining substantially the same physical properties as obtained with polyphenylene ether resin powder.

The invention also relates to articles formed out of the compositions made by the process of the invention.

13 Claims, No Drawings

POLYPHENYLENE ETHER RESIN CONCENTRATES

CROSS-REFERENCE TO RELATED APPLICATIONS

Not applicable.

FEDERALLY SPONSORED RESEARCH

Not applicable.

BACKGROUND OF THE INVENTION

1. Field of the Invention

The invention relates to a process for the manufacture of a thermoplastic composition comprising a polyphenylene ether resin and optionally, a styrenic resin wherein the processes comprises a polyphenylene ether resin in a particulate form having a particle size less than about 3 mm by 3 mm and having less than about 5% by weight, preferably less than about 2% by weight, more preferably less than about 1% by weight, and most preferably essentially no particles less than about 75 microns in size. The particulate form allows for ease of handling of polyphenylene ether resin with a substantially reduced risk of dust ignition while obtaining substantially the same physical properties as obtained with polyphenylene ether resin powder.

The invention also relates to articles formed out of the compositions made by the process of the invention.

2. Brief Description of the Related Art

Poly(phenylene ether) resins (referred to hereafter as "PPE") are commercially attractive materials because of their unique combination of physical, chemical, and electrical properties. Commercially, most PPE are sold as blends with predominantly high impact polystyrene resins. PPE are miscible with polystyrene resins in all proportions and because of the very high glass transition temperatures of PPE, the blends of PPE with polystyrene resins possess higher heat resistance than that of the polystyrene resins alone. Moreover, the combination of PPE with high impact polystyrene resins results in additional overall properties such as high flow and ductility. Examples of such blends can be found in U.S. Pat. Nos. 3,383,435; 4,097,550; 4,113,800; 4,101,503; 4,101,504; 4,101,505; 4,128,602; 4,139,574; and 4,154,712 among others. The properties of these blends can be further enhanced by the addition of various additives such as impact modifiers, flame retardants, light stabilizers, processing stabilizers, heat stabilizers, antioxidants and fillers.

Commercial PPE are produced as a relatively fine powder form typically having at least 10% by weight, often at least 20% by weight fine particles of less than about 75 microns in size. Particles less than about 75 microns in size are believed to lead to dust explosion hazards. Consequently these powders require special handling procedures to control dust and potential spark ignition hazards associated with such powders. Such handling procedures include grounding of equipment and use of inert gas blankets to exclude oxygen. It would be commercially advantageous to be able to ship PPE to various locations around the world for compounding into resin compositions to would serve local market needs. However, the handling procedures as described above require significant investment for equipment modifications and consequently limit the commercial feasibility for such compounding flexibility. Conversion of PPE powder using standard compounding extruders followed by pelletization of the extrudate to obtain pellets having dimensions of about 3 mm by 3 mm has been attempted a solution to the problems associated by PPE powder. Unfortunately, the physical properties of many resin compositions made using the pellets are inferior as compared to compositions made with PPE powder. Consequently, the utility of the PPE pellets approach has been limited.

It is therefore apparent there continues to be a need for improved processes to manufacture resin compositions containing PPE.

SUMMARY OF THE INVENTION

The needs discussed above have been generally satisfied by the discovery of a process for the manufacture of a thermoplastic composition containing:

a) at least one PPE, and b) optionally, at least one polystyrene resin;

wherein the process comprises at least one PPE having a particle size less than about 3 mm by 3 mm and wherein less than 5% by weight of the PPE have a particle size less than about 75 microns. The PPE having the described particle size employed in the process is preferably a PPE that has been ground from PPE that has been melt compounded. In one embodiment, test specimens made from the composition have at least 70%, preferably at least 80%, of the notched Izod impact strength of a control composition made using PPE powder.

The description which follows provides further details regarding this invention.

DESCRIPTION OF THE DRAWINGS

Not applicable.

DETAILED DESCRIPTION OF THE INVENTION

PPE are a well known class of compounds sometimes referred to as polyphenylene oxide resins. Examples of suitable PPE and processes for their preparation can be found in, for example, U.S. Pat. Nos. 3,306,874; 3,306,875; 3,257,357; and 3,257,358. Compositions of the present invention will encompass homopolymers, copolymers and graft copolymers obtained by the oxidative coupling of phenolic compounds. The preferred PPE used in compositions of the present invention are derived from 2,6-dimethyl phenol. Also contemplated are PPE copolymers derived from 2,6-dimethyl phenol and 2,3,6-trimethyl phenol.

Useful PPE include poly(2,6-dimethyl-1,4-phenylene ether) resin having an intrinsic viscosity (I.V.) of between about 0.10 and about 0.60 dl/g as measured in toluene at 25° C. and a concentration of 0.6 gram per 100 ml. In a preferred embodiment of the invention, the PPE have an intrinsic viscosity (I.V.) of between about 0.25 and about 0.50 dl/g as measured in toluene at 25° C. and a concentration of 0.6 gram per 100 ml.

The compositions of the present invention optionally contain at least one nonelastomeric polymer of an alkenylaromatic compound (i.e. polystyrene resin). Suitable polymers of this type may be prepared by methods known in the art including bulk, suspension and emulsion polymerization. They generally contain at least about 25% by weight of structural units derived from an alkenylaromatic monomer of the formula:

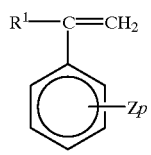

wherein $R^1$ is hydrogen, lower alkyl or halogen; Z is vinyl, halogen or lower alkyl; and p is from 0 to 5. These resins include homopolymers of styrene, chlorostyrene and vinyltoluene, random copolymers of styrene with one or more monomers illustrated by acrylonitrile, butadiene, α-methylstyrene, ethylvinylbenzene, divinylbenzene and maleic anhydride, and rubber-modified polystyrenes comprising blends and grafts, wherein the rubber is a polybutadiene or a rubbery copolymer of about 98–68% styrene and about 2–32% diene monomer. These rubber modified polystyrenes include high impact polystyrene (commonly referred to as HIPS). Non-elastomeric block copolymer compositions of styrene and butadiene can also be used that have linear block, radial block or tapered block copolymer architectures. They are commercially available from such companies as Fina Oil as under the trademark FINACLEAR and Phillips under the trademark K-RESINS.

The total amount of the polymer of a nonelastomeric alkenylaromatic compound can vary widely depending on the final properties desired. Generally, the nonelastomeric alkenylaromatic compound is utilized in the range of about 1% to about 95% by weight based on the total weight of the composition. The preferred range is about 20% to about 70% by weight and the most preferred range is about 35% to about 60% by weight; based on the total weight of the composition.

The physical form of the PPE used in the process of the present invention is important. The PPE particle size must be large enough to avoid issues associated with powders yet must be small enough such the physical properties of the PPE containing compositions closely approximate the properties obtained with PPE powder as manufactured. By closely approximate is meant that the notched Izod impact strength properties are at least 70%, preferably at least 80% of those of the same composition made with PPE powder as manufactured.

PPE powder in its as manufactured state can be subjected to melt compounding wherein the extrudate is collected and ground into the desired particle size. It is often beneficial to chop the extrudate into pellets of various sizes prior to being ground. A typical pellet has dimensions of about 3 mm by about 3 mm. The pellets are then ground in a continuous fashion or in a separate operation. The ground PPE has particle size with more than 50% by weight of the PPE less than about 3 mm by 3 mm, preferably less than about 1 mm by about 3 mm with an irregular particle shape. It is believed that the irregular particle shape aids in melting and dispersing the PPE in the compounding operation of the composition.

An important aspect of the invention is the reduced level of fine powder, i.e. powder of less than about 75 microns in size. It is believed that the PPE particles under about 75 microns in size play an important role in the dust explosion characteristics of the PPE powder as typically manufactured. In the present invention, the PPE comprises a particulate form having less than about 5% by weight, preferably less than about 2% by weight, more preferably less than about 1% by weight, and most preferably essentially no particles less than about 75 microns in size.

In the melt compounding of the PPE powder there may optionally be added at least one nonelastomeric alkenylaromatic compound as previously described to make a PPE concentrate. It is preferred that the PPE level in the concentrate be high, preferably at least 50%, more preferably at least 60%, most preferably at least 70% by weight PPE so that the greatest value is added through the PPE concentrate. When lower levels of PPE are used in the PPE concentrate the cost advantages are diminished as too much concentrate is used to make the final PPE composition.

The compositions of the present invention may also contain at least one impact modifier. The impact modifier may be added an ingredient in the preparation of the final composition or may be used in combination with a nonelastomeric alkenylaromatic compound in the PPE concentrate. The impact modifiers include block (typically diblock, triblock or radial teleblock) copolymers of alkenyl aromatic compounds and dienes. Most often at least one block is derived from styrene and at least one block from at least one of butadiene and isoprene. Especially preferred are the triblock and diblock copolymers comprising polystyrene blocks and diene derived blocks wherein the aliphatic unsaturation has been preferentially removed with hydrogenation. Mixtures of various copolymers are also sometimes useful. The weight average molecular weights of the impact modifiers are typically in the range of about 50,000 to 300,000. Block copolymers of this type are available commercially from a number of sources, including Phillips Petroleum under the trademark SOLPRENE, Shell Chemical Co. under the trademark KRATON, and Kuraray under the trademark SEPTON.

Various mixtures of the aforementioned impact modifiers are also sometimes useful. The amount of the impact modifier generally present, when one is used, is an amount effective to improve the physical properties, for example, the ductility of the composition when compared to the same composition without an impact modifier. Improved ductility can be indicated by increased impact strength, increased tensile elongation to break, or both increased impact strength and increased tensile elongation to break. Generally, when used, the impact modifier is utilized in the range of about 1% to about 20% by weight based on the total weight of the composition. The preferred range is about 3% to about 15% by weight; based on the total weight of the composition and the most preferred range is between about 5% to about 12% by weight; based on the total weight of the composition. The exact amount and types or combinations of impact modifiers utilized will depend in part on the requirements needed in the final blend composition.

Compositions of the present invention can also include effective amounts of at least one additive selected from the group consisting of thermoplastic resins such as, for example, polyolefins, polyetherimides, polyethersulfones, polysulfones, polyamides, polyesters, and polyarylene sulfides, compatibilizers, impact modifiers, anti-oxidants, flame retardants, drip retardants, crystallization nucleators, dyes, pigments, colorants, reinforcing agents, fillers, stabilizers, and antistatic agents. These additives are known in the art, as are their effective levels and methods of incorporation. Effective amounts of the additives vary widely, but they are usually present in an amount up to about 60% or more by weight, based on the weight of the entire composition.

PPE blends of the present invention can be prepared by a variety of methods involving intimate admixing of the materials with any additional additives desired in the formulation. Suitable procedures include solution blending and melt blending. Because of the availability of melt blending equipment in commercial polymer processing facilities, melt processing procedures are generally preferred. Examples of equipment used in such melt compounding methods include: co-rotating and counter-rotating extruders, single screw extruders, disc-pack processors and various other types of extrusion equipment. In some instances, the compounded material exits the extruder through small exit holes in a die and the resulting strands of molten resin are cooled by passing the strands through a water bath. The cooled strands can be chopped into pellets for packaging and further handling, including grinding. Commercial grinding equipment is known in the art and often involves revolving blades to reduce the particle size to the desired dimensions.

All of the ingredients may be added initially to the processing system, or else certain additives may be pre-compounded with each other. It is also sometimes advantageous to employ at least one vent port in each section between the feed ports to allow venting (either atmospheric or vacuum) of the melt. Those of ordinary skill in the art will be able to adjust blending times and temperatures, as well as component addition location and sequence, without undue additional experimentation.

It should also be clear that improved molded articles prepared from the compositions of the present invention represent an additional embodiment of this invention.

All patents cited by reference are incorporated by reference herein.

The following examples are provided to illustrate some embodiments of the present invention. They are not intended to limit the invention in any aspect. All percentages are by weight based on the total weight of the entire composition, unless otherwise indicated.

EXPERIMENTAL

The following examples are illustrative of the compositions of the present invention.

Compositions were evaluated comparing PPE in the form of (1) powder (control), (2) ground into a particle size of less than about 1 mm by about 3 mm, (3) pellets having a size of about 1 mm by 3 mm (mini), and (4) pellets having a size of 3 mm by 3 mm (regular). The energy input into the PPE was varied as "high" by addition of the PPE into the first barrel of an eleven barrel twin-screw extruder, or "low" by addition of the PPE into the seventh barrel of an eleven barrel twin-screw extruder. The I.V. of the PPE was varied between 0.33, 0.40, and 0.46. The standard formulation was as follows with all parts by weight: PPE: 41.75; HIPS: 37.22; tetraphenyl resorcinol diphosphate: 17.6; polystyrene-poly(butadiene)-polystyrene block copolymer: 1.7; LLDPE: 1.1; tridecylphosphite: 0.39; ZnO: 0.1; ZnS: 0.1: TSAN: 0.2.

The compositions were extruded on a Werner-Pfleiderer twin-screw extruder at a temperature of about 280–320° C. with vacuum applied to the melt during compounding. For concentrates, the vacuum level is typically low, e.g., 0 to about 3 inches. For final compositions, the vacuum level is typically higher, e.g., 3 to about 30 inches. The resultant compositions were molded using a van Dorn injection molding machine using a temperature set of about 275–300° C. and a mold temperature of about 80–110° C. Samples of the compositions were also subjected to measurement of notched Izod impact strength according to ASTM D256 (employing a sample size of 2.5 inch by 0.5 inch by 0.125 inch), Dynatup (energy to fracture, falling dart test) strength according to ASTM D3763 (using 4 inch diameter by 0.125 inch disks), flexural modulus and flexural strength according to ASTM D790 (employing a sample size of 6 inch by 0.5 inch by 0.25 inch), and tensile yield and tensile elongation at break according to ASTM D638.

TABLE 1

| Sample | | | 1 | 2 | 3 | 4 | 5 | 6 | 7 | 8 | 9 | 10 | 11 | 12 |
|---|---|---|---|---|---|---|---|---|---|---|---|---|---|---|
| Energy Input | | | High | Low | High | Low | High | Low | High | Low | High | Low | High | Low |
| PPE IV | | | 0.33 | 0.33 | 0.4 | 0.4 | 0.46 | 0.46 | 0.33 | 0.33 | 0.4 | 0.4 | 0.46 | 0.46 |
| Pellet Type[1] | | | R | R | R | R | R | R | M | M | M | M | M | M |
| Properties | | | | | | | | | | | | | | |
| HDT @ 264 psi | | ° F. | 172.3 | 170.8 | 170.7 | 168.5 | 168 | 168.6 | 171.3 | 170.5 | 171.8 | 167.2 | 171.2 | 170 |
| Notched Izod, 73° F. | | ft-lb/in | 1.87 | 2.18 | 3.5 | 4.23 | 3.43 | 3.6 | 1.89 | 2 | 3.22 | 4.48 | 4.04 | 3.37 |
| | std. dev. | | 0.038 | 0.198 | 0.684 | 0.847 | 0.292 | 0.153 | 0.112 | 0.098 | 0.14 | 0.589 | 0.438 | 0.191 |
| Notched Izod, −20° F. | | ft-lb/in | 1.36 | 1.5 | 1.62 | 1.62 | 1.61 | 1.45 | 1.34 | 1.4 | 1.55 | 1.71 | 1.52 | 1.65 |
| | std. dev. | | 0.045 | 0.113 | 0.136 | 0.125 | 0.127 | 0.058 | 0.166 | 0.038 | 0.144 | 0.127 | 0.128 | 0.139 |
| Energy to Failure, 73° F. | | ft-lb | 8.93 | 10.27 | 11.62 | 9.47 | 7.99 | 12.42 | 8.41 | 11.6 | 14.07 | 11.03 | 10.31 | 9.38 |
| | std. dev. | | 2.5 | 3.65 | 4.56 | 3.19 | 2.74 | 2.61 | 4.58 | 2.47 | 2.82 | 1.36 | 3.8 | 4.17 |
| Total Energy, 73° F. | | ft-lb | 12.01 | 14.57 | 17.68 | 18.93 | 12.97 | 15.45 | 14.49 | 12.81 | 19.77 | 19.11 | 15.99 | 13.7 |
| | std. dev. | | 3.79 | 4.68 | 3.81 | 1.54 | 0.95 | 1.49 | 2.04 | 3.44 | 2.79 | 2.1 | 0.88 | 1.22 |
| Energy to Failure, −20° F. | | ft-lb | 1.92 | 1.58 | 2.66 | 2.71 | 3.74 | 3.16 | 1.78 | 2.12 | 2.36 | 1.77 | 2.29 | 2.54 |
| | std. dev. | | 0.45 | 0.48 | 0.87 | 1.87 | 1.85 | 2.39 | 0.56 | 0.48 | 0.63 | 0.33 | 0.99 | 0.81 |
| Total Energy, −20° F. | | ft-lb | 2.18 | 1.93 | 2.89 | 3.41 | 5 | 3.82 | 2.02 | 2.27 | 2.55 | 2.14 | 2.75 | 4.88 |
| | std. dev. | | 0.38 | 0.46 | 0.72 | 2.02 | 1.89 | 2.13 | 0.56 | 0.49 | 0.58 | 0.41 | 0.72 | 1.91 |
| Flexural Modulus, 73° F. | | kpsi | 346 | 347 | 343 | 343 | 344 | 342 | 347 | 341 | 348 | 344 | 347 | 343 |
| | std. dev. | kpsi | 4.6 | 1.5 | 3.2 | 0.9 | 1.6 | 0.7 | 4.9 | 4.2 | 4.7 | 1.7 | 2.9 | 2.2 |
| Flex Str. @ yield, 73° F. | | psi | 11020 | 10930 | 11110 | 11040 | 10970 | 10920 | 10910 | 10880 | 11210 | 11200 | 11320 | 11080 |
| | std. dev. | | 189 | 43 | 20 | 47 | 34 | 60 | 37 | 107 | 185 | 42 | 147 | 56 |

TABLE 1-continued

| Sample | | | 1 | 2 | 3 | 4 | 5 | 6 | 7 | 8 | 9 | 10 | 11 | 12 |
|---|---|---|---|---|---|---|---|---|---|---|---|---|---|---|
| Flex E. @ | | lb-in | 34.66 | 35.04 | 35.39 | 34.91 | 34.48 | 34.87 | 34.76 | 34.95 | 35.17 | 35.72 | 35.4 | 35.25 |
| break, 73° F. | std. dev. | | 0.46 | 0.8 | 0.99 | 0.84 | 0.38 | 0.66 | 0.62 | 0.45 | 0.78 | 0.87 | 0.41 | 0.47 |
| Ten. Str. @ | | psi | 7936 | 7757 | 7826 | 7877 | 7750 | 7765 | 7725 | 7666 | 7930 | 7906 | 7930 | 7885 |
| yield, 73° F. | std. dev. | | 20 | 34 | 63 | 63 | 31 | 15 | 42 | 103 | 20 | 15 | 72 | 80 |
| Ten. Str. @ | | psi | 6498 | 6591 | 6705 | 6824 | 6893 | 6969 | 6432 | 6343 | 6809 | 6674 | 7032 | 7175 |
| break, 73° F. | std. dev. | | 169 | 50 | 85 | 106 | 90 | 60 | 134 | 286 | 134 | 193 | 101 | 92 |
| T. Elong. @ | | % | 28.47 | 25.92 | 25 | 23.64 | 20.21 | 17.18 | 29.88 | 29.92 | 23.86 | 25.62 | 19.03 | 14.85 |
| break, 73° F. | std. dev. | | 1.93 | 1.25 | 2.21 | 3.86 | 1.24 | 1.44 | 2.29 | 4.54 | 2.49 | 2.23 | 2.29 | 1.46 |

[1] R = pellet of 3 mm by 3 mm; M = pellet of 1 mm by 3 mm; G = ground to less than 1 mm by 3 mm; P = powder - control

TABLE 2

| Sample | | | 13 | 14 | 15 | 16 | 17 | 18 | 19 | 20 | 21 |
|---|---|---|---|---|---|---|---|---|---|---|---|
| Energy Input | | | High | Low | High | Low | High | Low | High | High | High |
| PPE IV | | | 0.33 | 0.33 | 0.4 | 0.4 | 0.46 | 0.46 | 0.33 | 0.4 | 0.46 |
| Pellet Type[1] | | | G | G | G | G | G | G | P | P | P |
| Properties | | | | | | | | | | | |
| HDT @ 264 psi | | ° F. | 167.9 | 169.3 | 172 | 171.6 | 170.8 | 170 | 167.8 | 168.7 | 172.2 |
| Notched Izod, 73° F. | | ft-lb/in | 1.95 | 2.22 | 4.29 | 4.77 | 4.91 | 5.02 | 2 | 3.81 | 5.77 |
| | std. dev. | | 0.118 | 0.067 | 0.812 | 0.135 | 0.246 | 0.282 | 0.064 | 0.791 | 0.236 |
| Notched Izod, −20° F. | | ft-lb/in | 1.27 | 1.45 | 1.63 | 1.69 | 1.72 | 1.63 | 1.45 | 1.72 | 1.85 |
| | std. dev. | | 0.036 | 0.079 | 0.106 | 0.056 | 0.06 | 0.12 | 0.094 | 0.148 | 0.739 |
| Energy to Failure, 73° F. | | ft-lb | 15.38 | 13.72 | 22.56 | 21.03 | 19.71 | 25.3 | 20.74 | 36.1 | 31.3 |
| | std. dev. | | 4.21 | 3.47 | 1.95 | 6.76 | 6.38 | 1.86 | 8.73 | 2.62 | 7.8 |
| Total Energy, 73° F. | | ft-lb | 17.61 | 17.17 | 26.14 | 25.83 | 24.54 | 32.53 | 24.73 | 36.4 | 34.76 |
| | std. dev. | | 3.48 | 1.86 | 4.87 | 7.7 | 5.9 | 1.48 | 3.73 | 2.6 | 5.65 |
| Energy to Failure, −20° F. | | ft-lb | 2.79 | 3.91 | 3.24 | 3 | 3.46 | 3.62 | 4.75 | 7.99 | 8.55 |
| | std. dev. | | 0.96 | 1.38 | 0.84 | 1.12 | 0.94 | 0.82 | 1.02 | 3.68 | 4.94 |
| Total Energy, −20° F. | | ft-lb | 2.95 | 4.01 | 3.4 | 3.15 | 3.69 | 4.19 | 4.83 | 8.1 | 8.66 |
| | std. dev. | | 0.87 | 1.31 | 0.72 | 1.03 | 0.78 | 0.35 | 0.95 | 3.59 | 4.89 |
| Flexural Modulus, 73° F. | | kpsi | 338 | 343 | 346 | 345 | 348 | 349 | 336 | 332 | 336 |
| | std.dev. | kpsi | 1.6 | 1.6 | 1.3 | 0.5 | 1.5 | 2.1 | 2.7 | 1.2 | 3.1 |
| Flex Str. @ yield, 73° F. | | psi | 10670 | 10950 | 11200 | 11110 | 11290 | 11350 | 10780 | 10820 | 11150 |
| | std.dev. | | 8 | 12 | 31 | 34 | 27 | 89 | 39 | 9 | 29 |
| Flex E. @ break, 73° F. | | lb-in | 33.58 | 34.77 | 35.37 | 34.89 | 35.71 | 35.85 | 34.05 | 34.16 | 35.56 |
| | std.dev. | | 0.42 | 0.17 | 0.44 | 0.21 | 0.46 | 0.91 | 0.66 | 0.58 | 0.42 |
| Ten. Str. @ yield, 73° F. | | psi | 7542 | 7766 | 7960 | 7905 | 7986 | 7975 | 7592 | 7748 | 7880 |
| | std.dev. | | 9 | 21 | 9 | 15 | 9 | 18 | 35 | 14 | 84 |
| T. Str. @ break, 73° F. | | psi | 6108 | 6345 | 6257 | 6244 | 6724 | 6382 | 5957 | 6042 | 6170 |
| | std.dev. | | 125 | 235 | 27 | 76 | 280 | 152 | 114 | 10 | 86 |
| T. Elong. @ break, 73° F. | | % | 32.69 | 27.95 | 32.43 | 29.31 | 24.65 | 31.15 | 32.69 | 31.94 | 37.7 |
| | std. dev. | | 1.97 | 4.15 | 2.61 | 1.24 | 3.07 | 3.98 | 2.57 | 1.27 | 9.09 |

[1] R = pellet of 3 mm by 3 mm; M = pellet of 1 mm by 3 mm; G = ground to less than 1 mm by 3 mm; P = powder - control The compositions in Tables 1 and 2 compare the same composition wherein the form of the PPE has been varied. Samples 19 to 21 illustrate controls varying the I.V. of the PPE but using the PPE in the powder form as commercially isolated and available. The physical properties obtained with these compositions illustrate the target values that would be desired if the PPE were utilized in an alternate form to that of isolated powder in the same or a new process. Samples 1 to 6 illustrate the physical properties obtained for the same composition varying the I.V. of the PPE but wherein the PPE is in a pellet form having an average size of about 3 mm by about 3 mm. Comparing the properties of samples 1 and 2 to control sample 19 of the same I.V. PPE; or samples 3 and 4 to control sample 20; or samples 5 and 6 to control sample 21 demonstrates the substantially poorer impact strength, especially Dynatup dart impact strength obtained when pellets having an average size of about 3 mm by about 3 mm are utilized. Likewise, the properties of samples 7 and 8 to control sample 19 of the same I.V. PPE; or samples 9 and 10 to control sample 20; or samples 11 and 12 to control sample 21 demonstrates the substantially poorer impact strength, especially Dynatup dart impact strength obtained when mini-pellets having an average size of about 1 mm by about 3 mm are utilized.

In contrast to the results using pellets or mini-pellets, the properties of samples 13 and 14 to control sample 19 of the same I.V. PPE; or samples 15 and 16 to control sample 20; or samples 17 and 18 to control sample 21 demonstrates the substantially better physical properties could be obtained using ground material. It was unexpected that the physical properties, especially the Dynatup dart impact strength, would be affected by the PPE particle size. It is thought that using a smaller PPE particle than the standard 3 mm by 3 mm pellet, and/or the irregular shape of the ground particles, affords less shear heating during the compounding operation with less thermal and shear degradation of the materials.

It should be clear that the present invention affords a method to prepare PPE compositions having a notched Izod impact strength measured at 73° F. of at least 70%, preferably of at least 80% of a control composition made using PPE powder while reducing the dust explosion tendency of PPE process.

The preceding examples are set forth to illustrate specific embodiments of the invention and are not intended to limit its scope. It should be clear that the present invention includes articles from the compositions as described herein. Additional embodiments and advantages within the scope of the claimed invention will be apparent to one or ordinary skill in the art.

What is claimed is:

1. A process for the manufacture of a thermoplastic composition containing:

a) at least one a polyphenylene ether resin, and b) optionally, at least one polystyrene resin;

wherein the process comprises melt-mixing at least one polyphenylene ether resin optionally, with at least one polystyrene resin wherein at least 50% by weight of at least one polyphenylene ether resin has particle size less than about 3 mm by 3 mm and wherein less than 5% by weight of the polyphenylene ether resin has a particle size less than about 75 microns.

2. The process of claim 1, wherein the process comprises at least one polystyrene resin.

3. The process of claim 1, wherein at least 50% by weight of at least one polyphenylene ether resin has particle size less than about 3 mm by about 3 mm.

4. The process of claim 1, wherein less than 2% by weight of the polyphenylene ether resin has a particle size less than about 75 microns.

5. The process of claim 1, wherein less than 1% by weight of the polyphenylene ether resin has a particle size less than about 75 microns.

6. The process of claim 1, wherein there is essentially no polyphenylene ether resin with a particle size less than about 75 microns.

7. The process of claim 1, wherein the notched Izod impact strength of a test specimen made from the composition is at least 70% than of a control composition made using polyphenylene ether resin powder that has at least 10% by weight polyphenylene ether resin with a particle size less than about 75 microns.

8. The process of claim 1, wherein at least one polyphenylene ether is in the form of a concentrate comprising a polyphenylene ether resin and a polystyrene resin.

9. The process of claim 8, wherein the concentrate comprises at least 50% by weight of a polyphenylene ether resin.

10. The process of claim 1, wherein the polyphenylene ether resin is present from about 5 to about 70 percent by weight based upon the weight of the entire composition.

11. The process of claim 1, further comprising an additive selected from the group consisting of stabilizers, dyes, pigments, and mixtures thereof.

12. A thermoplastic composition made by the process of claim 1.

13. Articles formed out of the composition made by the process of claim 1.

* * * * *